(12) United States Patent
Shimakawa et al.

(10) Patent No.: US 7,407,521 B2
(45) Date of Patent: Aug. 5, 2008

(54) PROCESS FOR PRODUCING NICKEL OXYHYDROXIDE BY ELECTROLYTIC OXIDATION

(75) Inventors: Mamoru Shimakawa, Fukui (JP); Takeshi Usui, Fukui (JP); Hideo Honma, Yokohama (JP); Taiji Nishiwaki, Yokohama (JP)

(73) Assignees: Tanaka Chemical Corporation, Fukui-shi (JP); Kanto Gakuin University Surface Engineering Research Institute, Yokohama-shi (JP)

( * ) Notice: Subject to any disclaimer, the term of this patent is extended or adjusted under 35 U.S.C. 154(b) by 687 days.

(21) Appl. No.: 10/354,942

(22) Filed: Jan. 30, 2003

(65) Prior Publication Data

US 2003/0186125 A1 Oct. 2, 2003

(30) Foreign Application Priority Data

Mar. 19, 2002 (JP) ............................. 2002-075474
Jul. 4, 2002 (JP) ............................. 2002-195993

(51) Int. Cl.
*H01M 4/82* (2006.01)
*H01M 4/00* (2006.01)

(52) U.S. Cl. ...................................... 29/623.1; 429/223
(58) Field of Classification Search ................. 429/223; 29/623.1; 423/21.1, 636, 594.3
See application file for complete search history.

(56) References Cited

U.S. PATENT DOCUMENTS

| 4,540,476 | A | * | 9/1985 | Dyer | ............................. 205/60 |
| 6,156,455 | A | * | 12/2000 | Yamamura et al. | ........... 429/223 |
| 6,686,091 | B2 | * | 2/2004 | Yamamoto et al. | ........... 429/223 |
| 2004/0101754 | A1 | * | 5/2004 | Yamamoto | ................... 429/223 |

FOREIGN PATENT DOCUMENTS

JP 10081522 A * 3/1998
JP 20022179427 6/2002

* cited by examiner

*Primary Examiner*—Tracy Dove
(74) *Attorney, Agent, or Firm*—Ohlandt, Greeley, Ruggiero & Perle, L.L.P.

(57) ABSTRACT

A process for production of nickel oxyhydroxide by electrolytic oxidation of nickel hydroxide in the presence of an alkali metal halide. The nickel oxyhydroxide is produced by adding nickel hydroxide particles to an aqueous solution of an alkali metal halide and stirring the mixture to prepare a nickel hydroxide slurry, and then converting a portion of the nickel hydroxide to nickel oxyhydroxide by electrolytic oxidation in the presence of the alkali metal halide.

2 Claims, 1 Drawing Sheet

×2.0k  0088  15kV  20μm

PROCESS FOR PRODUCING NICKEL OXYHYDROXIDE BY ELECTROLYTIC OXIDATION

FIELD OF THE INVENTION

The present invention relates to a process for producing nickel oxyhydroxide by electrolytic oxidation.

BACKGROUND OF THE INVENTION

Nickel oxyhydroxide is known as a raw material for cell positive electrode materials, and several production processes therefore are known. All such methods, however, have been less than satisfactory from the standpoints of working environment and cost.

SUMMARY OF THE INVENTION

It is an object of the invention to provide a process for producing nickel oxyhydroxide by electrolytic oxidation with advantages in terms of working environment and cost.

The production process of the invention is characterized by electrolytic oxidation of nickel hydroxide in the presence of an alkali metal halide to obtain nickel oxyhydroxide.

More specifically, the process for producing nickel oxyhydroxide by electrolytic oxidation according to the invention is characterized by adding nickel hydroxide particles to an aqueous solution of an alkali metal halide and stirring the mixture to prepare a nickel hydroxide slurry, and then converting a portion of the nickel hydroxide to nickel oxyhydroxide by electrolytic oxidation in the presence of the alkali metal halide. It is particularly characterized in that the alkali metal halide is potassium chloride.

DETAILED DESCRIPTION OF THE INVENTION

Figure 1:
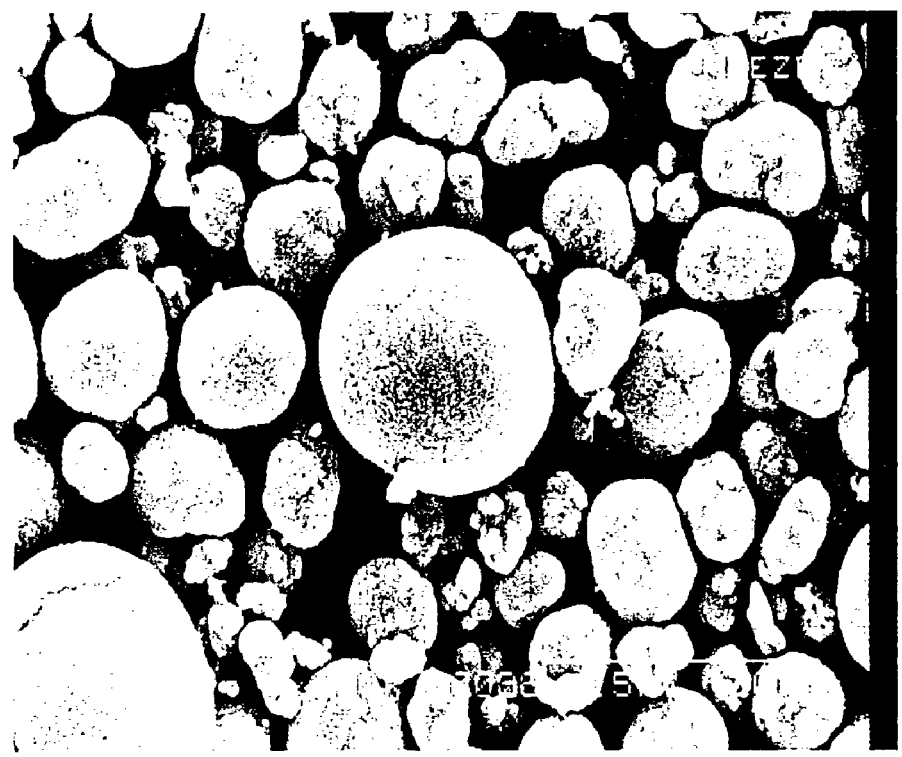
FIG. 1 is an electron microscope picture of the nickel oxyhydroxide obtained in Example 1.

Preferred embodiments of the production process of the invention will now be explained in detail.

The production process of the invention is characterized by adding nickel hydroxide particles to an aqueous solution of an alkali metal halide and stirring the mixture to prepare a nickel hydroxide slurry, and then converting it to nickel oxyhydroxide by electrolytic oxidation in the presence of the alkali metal halide.

There are no particular restrictions on the nickel hydroxide particles used as the raw material for the invention, and they may be a form of nickel hydroxide commonly used as positive electrode active substances for alkali secondary cells. Specifically, they preferably have a tapping density of 1.2-2.4 g/cc, a specific surface area of 3-40 $m^2/g$ and a mean particle size of 3-30 μm. The nickel hydroxide particles of the invention may also contain appropriate amounts of various other metals, if necessary. As examples of such metals there may be mentioned B, Ca, Mg, Al, Si, Sc, Ti, V, Cr, Mn, Fe, Co, Cu, Zn, Ga, Y, Zr, Nb, Mo, Ru, Sn, Sb, La, Ce, Pr, Nd, Hf, Ta, W and Pb. Any one or more of these elements may be added.

There are no particular restrictions on the amount of nickel hydroxide dispersed, but it will usually be in the range of 0.1-10 moles of nickel hydroxide per liter of water. The range is more preferably 0.5-5 moles from the standpoint of manageability or economy in the production steps.

The method of adjusting the pH is also not restricted, but it is preferred to use an aqueous solution of an alkali metal hydroxide, and specifically an aqueous solution of a halide (chloride, bromide or iodide) of lithium, sodium, potassium, rubidium, cesium or francium. Aqueous solutions of sodium chloride and potassium chloride are preferred, with potassium chloride aqueous solution being especially preferred. The preferred alkali metal halide concentration will usually be in the range of 0.1-4 moles per liter of water.

The preferred pH range will depend on the stability of the nickel hydroxide particles and the oxidation reaction system used, but a range of 7-13.5 is suitable.

Stirring is preferred according to the invention, with no particular restrictions being placed on the stirring apparatus. It need only be capable of stirring at the optimum rotation rate to convert the nickel hydroxide raw material to a slurry (a slurry being a state wherein the nickel hydroxide particles in the reaction solution are dispersed by stirring to form a suspension) in the solution in the reactor used for the invention, and to promote electrolytic oxidation reaction.

The nickel oxyhydroxide of the invention is nickel oxyhydroxide with a mean particle size of 3-30 μm, a bulk density of 0.5-1.9 g/cc and a tapping density of 1.3-2.6 g/cc. Also, it has a nearly spherical shape as shown in FIG. 1, with a specific surface area in the range of 3-40 $m^2/g$. The partially oxidized nickel oxyhydroxide particles of the invention also include secondary particles which are aggregates of fine primary particles.

The electrolytic oxidation method of the invention may employ a Pt (or Pt-coated), $PbO_2$, Pb, carbon, ferrite, $RuO_2$, $IrO_2$, $RuO_2 \cdot IrO_2$ or DSA (dimensional stabilized anode) electrode as the anode. There are no particular restrictions on the shape of the anode, and it may be easily selected by a person skilled in the art depending on the degree of oxidation, the oxidation time, etc. Especially preferred are disk or mesh shapes. The cathode may be Pt, Au, carbon DSC (dimensional stabilized cathode) or stainless steel. The current may be a pulse current, and the electrolyte used is an alkali metal halide, specifically sodium chloride or potassium chloride, and most preferably potassium chloride. The halide concentration may be in a range from 0.1 mol to the solubility in water. The electrode ratio (anode:cathode) in terms of area is 1:1 when the cathode end is discharged in water alone, and it is in the range of 1:1 to 200:1 in cases without diaphragm electrolysis, while it may be disregarded in cases with diaphragm electrolysis. The diaphragm employs an ion-exchange film and porous plate, with an anion-exchange film being preferred. The temperature is 20-70° C., the current density is 2.5-15.0 $A/dm^2$ and the cell voltage is 2-15 V.

According to the invention it is possible to produce nickel oxyhydroxide with any desired degree of oxidation.

EXAMPLES

The invention will now be explained in greater detail through the following examples which are in no way limitative on the invention.

Measurement of physical properties

The metal element contents, mean particle sizes, bulk densities, tapping densities and oxidation degrees were measured by the following methods. The metal element contents were measured using an ICP (SPS7000S, product of Seiko Electronics). The mean particle sizes were measured as the 50% cumulative particle sizes, using a particle diameter distribution analyzer (LA-300) by Horiba, Ltd. The bulk densities and tapping densities were measured as the densities before and after tapping 200 times with a 4 cm spacer, using a "KYT-3000" Tap Denser by Seishin Enterprise Co., Ltd. The moisture contents were measured using a CZA-2000 by Chino Corporation. The BET values were measured using a 4-probe fully automatic surface area measuring apparatus by Yuasa-Ionics. The oxidation degrees were determined by obtaining a precisely weighed 0.2 g sample, thoroughly dissolving it in a 1:1 solution of sulfuric acid/potassium iodide, and then back titrating the free iodine with a sodium thiosulfate solution and calculating the oxidation degree from the titer.

The nickel hydroxide used as the raw material and the compositions of oxidized nickel oxyhydroxide obtained in each of the examples are shown in Tables 1, 2 and 3.

Example 1

After placing 500 mL of water in a 500 mL beaker and adding 20 g of spherical nickel hydroxide as raw material having the composition listed in Table 1 and 50 g of NaCl, a stirring apparatus was used for stirring at 400 rpm for uniform blending of the liquid and solid phases to prepare a nickel hydroxide slurry.

For electrolytic oxidation, one 100 mm length×50 mm width Pt(Ti) mesh electrode and a Pt wire electrode were set in the nickel hydroxide slurry, and a constant-voltage direct current power source (product of Sansha Electric Mfg. Co., Ltd.) was used at an electrode gap voltage of 5 V and a temperature of 18° C., with stirring at 400 rpm for 2 hours. The pH was 11 at the start of electrolysis. After termination of the stirring, the particulate matter in the beaker was rinsed with water, filtered and dried at 60° C. for 24 hours to obtain a black dry powder.

The product had a moisture content of 0.31%, a BET of 8.8 $m^2/g$, a mean particle size of 9.6 μm and an oxidation degree of 12.3%. The results of electron microscope analysis are shown in FIG. 1 (2000×).

Example 2

After placing 500 mL of water in a 500 mL beaker and adding 50 g of spherical nickel hydroxide as raw material having the composition listed in Table 1 and 75 g of KCl, a stirring apparatus was used for stirring at 400 rpm for uniform blending of the liquid and solid phases to prepare a nickel hydroxide slurry.

For electrolytic oxidation, one 100 mm length×50 mm width Pt(Ti) mesh electrode and a Pt wire electrode were set in the nickel hydroxide slurry, and a constant-voltage direct current power source (product of Sansha Electric Mfg. Co., Ltd) was used at an electrode gap voltage of 5 V and a temperature of 18° C., with stirring at 400 rpm for 2 hours. The pH was 11 at the start of electrolysis. After termination of the stirring, the particulate matter in the beaker was rinsed with water, filtered and dried at 60° C. for 24 hours to obtain a black dry powder.

The product had a moisture content of 1.31%, a BET of 9.0 $m^2/g$, a mean particle size of 9.7 μm and an oxidation degree of 15.4%.

Example 3

After placing 500 mL of water in a 500 mL beaker and adding 50 g of spherical nickel hydroxide as raw material having the composition listed in Table 1 and 75 g of KCl, a stirring apparatus was used for stirring at 400 rpm for uniform blending of the liquid and solid phases to prepare a nickel hydroxide slurry.

For electrolytic oxidation, one 100 mm length×50 mm width Pt(Ti) mesh electrode and a Pt wire electrode were set in the nickel hydroxide slurry, and a constant-voltage direct current power source (product of Sansha Electric Mfg. Co., Ltd) was used at an electrode gap voltage of 5 V and a temperature of 60° C., with stirring at 400 rpm for 2 hours. The pH was 11 at the start of electrolysis. After termination of the stirring, the particulate matter in the beaker was rinsed with water, filtered and dried at 60° C. for 24 hours to obtain a black dry powder.

The product had a moisture content of 1.42%, a BET of 9.3 $m^2/g$, a mean particle size of 24.5 μm and an oxidation degree of 24.5%.

Example 4

After placing 500 mL of water in a 500 mL beaker and adding 50 g of spherical nickel hydroxide as raw material having the composition listed in Table 1 and 75 g of KCl, a stirring apparatus was used for stirring at 400 rpm for uniform blending of the liquid and solid phases to prepare a nickel hydroxide slurry.

For electrolytic oxidation, one 100 mm length×50 mm width Pt(Ti) mesh electrode and a Pt wire electrode were set in the nickel hydroxide slurry, and a constant-voltage direct current power source (product of Sansha Electric Mfg. Co., Ltd) was used at an electrode gap voltage of 5 V and a temperature of 60° C., with stirring at 400 rpm for 2 hours. The pH was 13 at the start of electrolysis. After termination of the stirring, the particulate matter in the beaker was rinsed with water, filtered and dried at 60° C. for 24 hours to obtain a black dry powder.

The product had a moisture content of 0.99%, a BET of 7.5 $m^2/g$, a mean particle size of 9.5 μm and an oxidation degree of 6.9%.

Example 5

After placing 500 mL of water in a 500 mL beaker and adding 50 g of spherical nickel hydroxide as raw material having the composition listed in Table 1 and 75 g of KCl, a stirring apparatus was used for stirring at 400 rpm for uniform blending of the liquid and solid phases to prepare a nickel hydroxide slurry.

For electrolytic oxidation, one 100 mm length×50 mm width Pt(Ti) mesh electrode and a Pt wire electrode were set in the nickel hydroxide slurry, and a constant-voltage direct current power source (product of Sansha Electric Mfg. Co., Ltd) was used at an electrode gap voltage of 5 V and a temperature of 60° C., with stirring at 400 rpm for 8 hours. The pH was 9 at the start of electrolysis. After termination of the stirring, the particulate matter in the beaker was rinsed with water, filtered and dried at 60° C. for 24 hours to obtain a black dry powder.

The product had a moisture content of 1.63%, a BET of 10 $m^2/g$, a mean particle size of 9.8 μm and an oxidation degree of 28.2%.

Example 6

After placing 500 mL of water in a 500 mL beaker and adding 50 g of spherical nickel hydroxide as raw material having the composition listed in Table 2 and 75 g of KCl, a stirring apparatus was used for stirring at 400 rpm for uniform blending of the liquid and solid phases to prepare a nickel hydroxide slurry.

For electrolytic oxidation, one 92 mm length×50 mm width RuO$_2$·IrO$_2$ mesh electrode (RuO$_2$:IrO$_2$=37:63) and a Pt wire electrode were set in the nickel hydroxide slurry, and a constant-voltage direct current power source (product of Sansha Electric Mfg. Co.,Ltd) was used at an electrode gap voltage of 5 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 1.20%, a BET of 9.6 m$^2$/g, a mean particle size of 9.8 μm and an oxidation degree of 32.9%.

Example 7

After placing 500 mL of water in a 500 mL beaker and adding 50 g of spherical nickel hydroxide as raw material having the composition listed in Table 2 and 75 g of KCl, a stirring apparatus was used for stirring at 400 rpm for uniform blending of the liquid and solid phases to prepare a nickel hydroxide slurry.

For electrolytic oxidation, two 64 mm length×50 mm width RuO$_2$·IrO$_2$ mesh electrodes (RuO$_2$:IrO$_2$=37:63) and a Pt plate electrode were set in the nickel hydroxide slurry, and a constant-voltage direct current power source (product of Sansha Electric Mfg. Co.,Ltd) was used at an electrode gap voltage of 5 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 1.13%, a BET of 9.2 m$^2$/g, a mean particle size of 9.8 μm and an oxidation degree of 41.6%.

Example 8

After placing 500 mL of water in a 500 mL beaker and adding 50 g of spherical nickel hydroxide as raw material having the composition listed in Table 2 and 75 g of KCl, a stirring apparatus was used for stirring at 400 rpm for uniform blending of the liquid and solid phases to prepare a nickel hydroxide slurry.

For electrolytic oxidation, one 92 mm length×50 mm width RuO$_2$·IrO$_2$ mesh electrode (RuO$_2$:IrO$_2$=37:63) and a Pt wire electrode were set in the nickel hydroxide slurry, and a constant-voltage direct current power source (product of Sansha Electric Mfg. Co.,Ltd) was used at an electrode gap voltage of 10 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 1.08%, a BET of 12.1 m$^2$/g, a mean particle size of 9.4 μm and an oxidation degree of 82.1%.

Example 9

After placing 500 mL of water in a 500 mL beaker and adding 50 g of spherical nickel hydroxide as raw material having the composition listed in Table 2 and 75 g of KCl, a stirring apparatus was used for stirring at 400 rpm for uniform blending of the liquid and solid phases to prepare a nickel hydroxide slurry.

For electrolytic oxidation, two 64 mm length×50 mm width RuO$_2$.IrO$_2$ mesh electrodes (RuO$_2$:IrO$_2$=37:63) and a Pt plate electrode were set in the nickel hydroxide slurry, and a constant-voltage direct current power source (product of Sansha Electric Mfg. Co.,Ltd) was used at an electrode gap voltage of 10 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 1.07%, a BET of 15.9 m$^2$/g, a mean particle size of 9.5 μm and an oxidation degree of 96.4%.

Example 10

After placing 500 mL of water in a 500 mL beaker and adding 50 g of spherical nickel hydroxide as raw material having the composition listed in Table 2 and 75 g of KCl, a stirring apparatus was used for stirring at 400 rpm for uniform blending of the liquid and solid phases to prepare a nickel hydroxide slurry.

For electrolytic oxidation, one 95 mm length×50 mm width PbO$_2$ mesh electrode and a Pt wire electrode were set in the nickel hydroxide slurry, and a constant-voltage direct current power source (product of Sansha Electric Mfg. Co.,Ltd) was used at an electrode gap voltage of 5 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 0.94%, a BET of 9.9 m$^2$/g, a mean particle size of 9.8 μm and an oxidation degree of 39.7%.

Example 11

After placing 500 mL of water in a 500 mL beaker and adding 50 g of spherical nickel hydroxide as raw material having the composition listed in Table 2 and 75 g of KCl, a stirring apparatus was used for stirring at 400 rpm for uniform blending of the liquid and solid phases to prepare a nickel hydroxide slurry.

For electrolytic oxidation, one 95 mm length×50 mm width PbO$_2$ mesh electrode and a Pt wire electrode were set in the nickel hydroxide slurry, and a constant-voltage direct current power source (product of Sansha Electric Mfg. Co.,Ltd) was used at an electrode gap voltage of 5 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 0.99%, a BET of 10.5 m$^2$/g, a mean particle size of 9.7 μm and an oxidation degree of 53.5%.

Example 12

After placing 500 mL of water in a 500 mL beaker and adding 50 g of spherical nickel hydroxide as raw material having the composition listed in Table 2 and 75 g of KCl, a stirring apparatus was used for stirring at 400 rpm for uniform blending of the liquid and solid phases to prepare a nickel hydroxide slurry.

For electrolytic oxidation, two 66 mm length×50 mm width PbO$_2$ mesh electrodes and a Pt plate electrode were set in the nickel hydroxide slurry, and a constant-voltage direct current power source (product of Sansha Electric Mfg. Co., Ltd) was used at an electrode gap voltage of 5 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 1.03%, a BET of 8.8 $m^2/g$, a mean particle size of 9.7 μm and an oxidation degree of 46.5%.

Example 13

After placing 500 mL of water in a 500 mL beaker and adding 50 g of spherical nickel hydroxide as raw material having the composition listed in Table 2 and 75 g of KCl, a stirring apparatus was used for stirring at 400 rpm for uniform blending of the liquid and solid phases to prepare a nickel hydroxide slurry.

For electrolytic oxidation, one 95 mm length×50 mm width $PbO_2$ mesh electrode and a Pt wire electrode were set in the nickel hydroxide slurry, and a constant-voltage direct current power source (product of Sansha Electric Mfg. Co.,Ltd) was used at an electrode gap voltage of 10 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 1.17%, a BET of 14.6 $m^2/g$, a mean particle size of 9.6 μm and an oxidation degree of 95.7%.

Example 14

After placing 500 mL of water in a 500 mL beaker and adding 50 g of spherical nickel hydroxide as raw material having the composition listed in Table 2 and 75 g of KCl, a stirring apparatus was used for stirring at 400 rpm for uniform blending of the liquid and solid phases to prepare a nickel hydroxide slurry.

For electrolytic oxidation, two 66 mm length×50 mm width $PbO_2$ mesh electrodes and a Pt plate electrode were set in the nickel hydroxide slurry, and a constant-voltage direct current power source (product of Sansha Electric Mfg. Co., Ltd) was used at an electrode gap voltage of 10 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 0.83%, a BET of 10.3 $m^2/g$, a mean particle size of 9.6 μm and an oxidation degree of 77.8%.

Example 15

After placing 500 mL of water in a 500 mL beaker and adding 50 g of spherical nickel hydroxide as raw material having the composition listed in Table 3 and 75 g of KCl, a stirring apparatus was used for stirring at 400 rpm for uniform blending of the liquid and solid phases to prepare a nickel hydroxide slurry.

For electrolytic oxidation, one 92 mm length×50 mm width $IrO_2$—$RuO_2$ mesh electrode and a Pt wire electrode were set in the nickel hydroxide slurry, and a constant-voltage direct current power source (product of Sansha Electric Mfg. Co., Ltd) was used at an electrode gap voltage of 10 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 1.3%, a BET of 10 $m^2/g$, a mean particle size of 9.8 μm and an oxidation degree of 69.8%.

Example 16

After placing 500 mL of water in a 500 mL beaker and adding 50 g of spherical nickel hydroxide as raw material having the composition listed in Table 3 and 75 g of KCl, a stirring apparatus was used for stirring at 400 rpm for uniform blending of the liquid and solid phases to prepare a nickel hydroxide slurry.

For electrolytic oxidation, two 64 mm length×50 mm width $IrO_2$—$RuO_2$ mesh electrodes and a Pt plate electrode were set in the nickel hydroxide slurry, and a constant-voltage direct current power source (product of Sansha Electric Mfg. Co.,Ltd) was used at an electrode gap voltage of 10 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 1.31%, a BET of 14.1 $m^2/g$, a mean particle size of 9.5 μm and an oxidation degree of 94.6%.

Example 17

After placing 500 mL of water in a 500 mL beaker and adding 50 g of spherical nickel hydroxide as raw material having the composition listed in Table 3 and 75 g of KCl, a stirring apparatus was used for stirring at 400 rpm for uniform blending of the liquid and solid phases to prepare a nickel hydroxide slurry.

For electrolytic oxidation, two 92 mm length×50 mm width $IrO_2$ mesh electrodes and a Pt plate electrode were set in the nickel hydroxide slurry, and a constant-voltage direct current power source (product of Sansha Electric Mfg. Co., Ltd) was used at an electrode gap voltage of 10 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 1.23%, a BET of 14.4 $m^2/g$, a mean particle size of 9.5 μm and an oxidation degree of 95.2%.

Example 18

After placing 500 mL of water in a 500 mL beaker and adding 50 g of spherical nickel hydroxide as raw material having the composition listed in Table 3 and 75 g of KCl, a stirring apparatus was used for stirring at 400 rpm for uniform blending of the liquid and solid phases to prepare a nickel hydroxide slurry.

For electrolytic oxidation, two 64 mm length×50 mm width $IrO_2$ flat electrodes and a Pt plate electrode were set in the nickel hydroxide slurry, and a constant-voltage direct current power source (product of Sansha Electric Mfg. Co., Ltd) was used at an electrode gap voltage of 10 V and a temperature of 60° C., with stirring at 400 rpm for 2 hours.

The pH was 8.5 at the start of electrolysis. After termination of the stirring, the particulate matter in the beaker was rinsed with water, filtered and dried at 60° C. for 24 hours to obtain a black dry powder.

The product had a moisture content of 1.48%, a BET of 12.2 m$^2$/g, a mean particle size of 9.4 µm and an oxidation degree of 90.5%.

Example 19

After placing 500 mL of water in a 500 mL beaker and adding 50 g of spherical nickel hydroxide as raw material having the composition listed in Table 3 and 75 g of KCl, a stirring apparatus was used for stirring at 400 rpm for uniform blending of the liquid and solid phases to prepare a nickel hydroxide slurry.

For electrolytic oxidation, two 64 mm length×50, mm width PbO$_2$ mesh electrodes and a Pt plate electrode were set in the nickel hydroxide slurry, and a constant-voltage direct current power source (product of Sansha Electric Mfg. Co., Ltd) was used at an electrode gap voltage of 10 V and a temperature of 60° C., with stirring at 400 rpm for 2 hours. The pH was 8.5 at the start of electrolysis. After termination of the stirring, the particulate matter in the beaker was rinsed with water, filtered and dried at 60° C. for 24 hours to obtain a black dry powder.

The product had a moisture content of 1.42%, a BET of 9.6 m$^2$/g, a mean particle size of 9.8 µm and an oxidation degree of 95.8%.

Comparative Example

Nickel oxyhydroxide by chemical oxidation

After placing 500 mL of water in a 1000 mL beaker and adding 50 g of spherical nickel hydroxide as raw material having the composition listed in Table 1, a stirring apparatus was used for stirring at 400 rpm for uniform blending of the liquid and solid phases to prepare a nickel hydroxide slurry.

Chemical oxidation was carried out while stirring at 400 rpm with addition of 200 mL of sodium hypochlorite with an effective chlorine content of 15%. The pH was 13 at the start of the reaction. After termination of the stirring, the particulate matter in the beaker was rinsed with water, filtered and dried at 60° C. for 24 hours to obtain a black dry powder.

The product had a moisture content of 0.95%, a BET of 8.4 m$^2$/g, a mean particle size of 9.5 µm and an oxidation degree of 97.0%.

TABLE 1

| | Raw material | Comp. Example | Examples | | | | |
|---|---|---|---|---|---|---|---|
| Sample No. | | | 1 | 2 | 3 | 4 | 5 |
| Electrolyte solution | — | — | NaCl | KCl | KCl | KCl | KCl |
| Charging amount (g) | — | — | 50 | 75 | 75 | 75 | 75 |
| Reaction time (hr) | — | 2 | 2 | 2 | 2 | 2 | 8 |
| Reaction temp. (° C.) | — | 50 | 18 | 18 | 60 | 60 | 60 |
| Electrolysis initial pH | — | ≈13 | 11 | 11 | 11 | 12 | 9 |
| Positive electrode type | | | Pt(Ti) | Pt(Ti) | Pt(Ti) | Pt(Ti) | Pt(Ti) |
| Positive electrode size (mm × mm) | | | 100 × 50 | 100 × 50 | 100 × 50 | 100 × 50 | 100 × 50 |
| Negative electrode type | | | Pt wire | Pt wire | Pt wire | Pt wire | Pt wire |
| Voltage (V) | | | 5 | 5 | 5 | 5 | 5 |
| Ni (%) | 56.4 | 56 | 56.2 | 56.5 | 56.5 | 56.4 | 56.4 |
| Co (%) | 3.01 | 3.01 | 3.01 | 3.02 | 3.02 | 3.02 | 2.99 |
| Zn (%) | 3.09 | 3.07 | 3.10 | 3.12 | 3.12 | 3.12 | 3.14 |
| Ca (%) | 0.0020 | 0.0059 | 0.0037 | 0.0040 | 0.0041 | 0.0043 | 0.0060 |
| Mg (%) | 0.015 | 0.0016 | 0.0011 | 0.0012 | 0.0012 | 0.0014 | 0.0021 |
| Na (%) | 0.009 | 0.43 | 0.023 | 0.009 | 0.007 | 0.007 | 0.006 |
| K (%) | — | — | — | — | — | — | — |
| SO$_4$ (%) | 0.24 | 0.17 | 0.19 | 0.18 | 0.17 | 0.17 | 0.16 |
| Tapping density (g/ml) | 2.21 | 2.57 | — | — | — | — | — |
| Bulk density (g/ml) | 1.66 | 1.77 | — | — | — | — | — |
| H$_2$O (%) | 0.56 | 0.95 | 0.31 | 1.31 | 1.42 | 0.99 | 1.63 |
| BET (m$^2$/g) | 7.0 | 8.4 | 8.8 | 9.0 | 9.3 | 7.5 | 10.0 |
| Mean particle size (µm) | 9.5 | 9.5 | 9.6 | 9.7 | 9.6 | 9.5 | 9.8 |
| Oxidation degree (%) | — | 97.0 | 12.3 | 15.4 | 24.5 | 6.9 | 28.2 |

Note:
"—" symbols indicate no measurement.

TABLE 2

| | Raw material | Comp. Example | Examples | | | | | | | | |
|---|---|---|---|---|---|---|---|---|---|---|---|
| Sample No. | | | 6 | 7 | 8 | 9 | 10 | 11 | 12 | 13 | 14 |
| Electrolyte solution | — | — | KCl | KCl | KCl | KCl | KCl | KCl | KCl | KCl | KCl |
| Charging amount (g) | — | — | 75 | 75 | 75 | 75 | 75 | 75 | 75 | 75 | 75 |
| Reaction time (hr) | — | 2 | 2 | 2 | 2 | 2 | 2 | 2 | 2 | 2 | 2 |
| Reaction temp. (° C.) | — | 50 | 60 | 60 | 60 | 60 | 60 | 60 | 60 | 60 | 60 |
| Electrolysis initial pH | — | ≈13 | 8.5 | 8.5 | 8.5 | 8.5 | 8.5 | 8.5 | 8.5 | 8.5 | 8.5 |
| Type of positive electrode | | | RuO$_2$• IrO$_2$ × 1 | RuO$_2$• IrO$_2$ × 2 | RuO$_2$• IrO$_2$ × 1 | RuO$_2$• IrO$_2$ × 2 | PbO$_2$ × 1 | PbO$_2$ × 1 | PbO$_2$ × 2 | PbO$_2$ × 1 | PbO$_2$ × 2 |
| Positive electrode size (mm × mm) | | | 92 × 50 | 64 × 50 × 2 | 92 × 50 | 64 × 50 × 2 | 95 × 50 | 95 × 50 | 66 × 50 × 2 | 95 × 50 | 66 × 50 × 2 |

TABLE 2-continued

|  | Raw material | Comp. Example | Examples | | | | | | | | |
|---|---|---|---|---|---|---|---|---|---|---|---|
| Type of negative electrode | | | Pt wire | Pt plate | Pt wire | Pt plate | Pt wire | Pt wire | Pt plate | Pt wire | Pt plate |
| Voltage (V) | | | 5 | 5 | 10 | 10 | 5 | 5 | 5 | 10 | 10 |
| Ni (%) | 56.4 | 56 | 56.3 | 56.2 | 56.2 | 56.3 | 56.1 | 56.2 | 56.1 | 56.0 | 55.6 |
| Co (%) | 3.01 | 3.01 | 2.99 | 2.98 | 2.98 | 2.98 | 2.98 | 2.98 | 2.98 | 2.97 | 2.96 |
| Zn (%) | 3.09 | 3.07 | 3.13 | 3.12 | 3.12 | 3.13 | 3.12 | 3.13 | 3.12 | 3.12 | 3.11 |
| Ca (%) | 0.02 | 0.0059 | — | — | — | — | — | — | — | — | — |
| Mg (%) | 0.015 | 0.0016 | — | — | — | — | — | — | — | — | — |
| Na (%) | 0.009 | 0.43 | 0.0057 | 0.0062 | 0.0062 | 0.0048 | 0.0060 | 0.0056 | 0.0061 | 0.0052 | 0.0052 |
| K (%) | — | — | 0.023 | 0.024 | 0.060 | 0.110 | 0.036 | 0.038 | 0.050 | 0.130 | 0.099 |
| SO$_4$ (%) | 0.24 | 0.17 | 0.16 | 0.16 | 0.14 | 0.14 | 0.15 | 0.15 | 0.15 | 0.13 | 0.14 |
| Tapping density (g/ml) | 2.21 | 2.57 | — | — | — | — | — | — | — | — | — |
| Bulk density (g/ml) | 1.66 | 1.77 | — | — | — | — | — | — | — | — | — |
| H$_2$O (%) | 0.56 | 0.95 | 1.20 | 1.13 | 1.08 | 1.07 | 0.94 | 0.99 | 1.03 | 1.17 | 0.83 |
| BET (m$^2$/g) | 7.0 | 8.4 | 9.6 | 9.2 | 12.1 | 15.9 | 9.9 | 10.5 | 8.8 | 14.6 | 10.3 |
| Mean particle size (μm) | 9.5 | 9.5 | 9.8 | 9.8 | 9.4 | 9.5 | 9.8 | 9.7 | 9.7 | 9.6 | 9.6 |
| Oxidation degree (%) | — | 97.0 | 32.9 | 41.6 | 82.1 | 96.4 | 39.7 | 53.5 | 46.5 | 95.7 | 77.8 |

Note:
"—" symbols indicate no measurement.

TABLE 3

|  | Raw material | Comp. Example | Examples | | | | |
|---|---|---|---|---|---|---|---|
| Sample No. | | | 15 | 16 | 17 | 18 | 19 |
| Electrolyte solution | — | — | KCl | KCl | KCl | KCl | KCl |
| Charging amount (g) | — | — | 75 | 75 | 75 | 75 | 75 |
| Reaction time (hr) | — | 2 | 2 | 2 | 2 | 2 | 2 |
| Reaction temp. (° C.) | — | 50 | 60 | 60 | 60 | 60 | 60 |
| Electrolysis initial | — | ≈13 | 8.5 | 8.5 | 8.5 | 8.5 | 8.5 |
| Positive electrode type | | | IrO$_2$—RuO$_2$ | IrO$_2$—RuO$_2$ | IrO$_2$ | IrO$_2$ | PbO$_2$ |
| Positive electrode size (mm × mm) | | | 92 × 50 × 1 | 64 × 50 × 2 | 92 × 50 × 2 | 64 × 50 × 2 | 64 × 50 × 2 |
| Negative electrode type | | | Pt wire | Pt plate | Pt plate | Pt plate | Pt plate |
| Voltage (V) | | | 10 | 10 | 10 | 10 | 10 |
| Ni (%) | 56.4 | 56.0 | 56.0 | 56.0 | 55.5 | 55.9 | 55.6 |
| Co (%) | 3.01 | 3.01 | 2.97 | 2.97 | 2.96 | 2.96 | 2.94 |
| Zn (%) | 3.09 | 3.07 | 3.11 | 3.12 | 3.12 | 3.12 | 3.1 |
| Ca (%) | 0.002 | 0.0059 | — | — | — | — | — |
| Mg (%) | 0.015 | 0.0016 | — | — | — | — | — |
| Na (%) | 0.009 | 0.43 | 0.0052 | 0.0050 | 0.0050 | 0.0054 | 0.0061 |
| K (%) | — | — | 0.039 | 0.100 | 0.160 | 0.100 | 0.260 |
| SO$_4$ (%) | 0.24 | 0.17 | 0.15 | 0.15 | 0.14 | 0.15 | 0.14 |
| Tapping density (g/ml) | 2.21 | 2.57 | — | — | — | — | — |
| Bulk density (g/ml) | 1.66 | 1.77 | — | — | — | — | — |
| H$_2$O (%) | 0.56 | 0.95 | 1.3 | 1.31 | 1.23 | 1.48 | 1.42 |
| BET (m$^2$/g) | 7.0 | 8.4 | 10 | 14.1 | 14.4 | 12.2 | 9.6 |
| Mean particle size (μm) | 9.5 | 9.5 | 9.8 | 9.5 | 9.5 | 9.4 | 9.8 |
| Oxidation degree (%) | — | 97.0 | 69.8 | 94.6 | 95.2 | 90.5 | 95.8 |

Note:
"—" symbols indicate no measurement.

What is claimed is:

1. A process for producing nickel oxyhydroxide, comprising the steps of:
   adding nickel hydroxide particles to an aqueous solution of an alkali metal halide to produce a mixture;
   stirring said mixture to prepare a nickel hydroxide slurry; and thereafter
   electrolytically oxidizing said nickel hydroxide slurry to convert said nickel hydroxide particles to nickel oxyhydroxide.

2. A process for producing nickel oxyhydroxide according to claim 1, wherein said alkali metal halide is potassium chloride.

* * * * *